(12) United States Patent
Kanno (10) Patent No.: US 7,854,447 B2
(45) Date of Patent: Dec. 21, 2010

(54) INTERIOR PANEL ASSEMBLY AND AIRBAG DEVICE

(75) Inventor: Yuki Kanno, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 12/048,344

(22) Filed: Mar. 14, 2008

(65) Prior Publication Data

US 2008/0296874 A1 Dec. 4, 2008

(30) Foreign Application Priority Data

May 30, 2007 (JP) .............................. 2007-143687

(51) Int. Cl.
*B60R 21/205* (2006.01)
*B60R 21/215* (2006.01)

(52) U.S. Cl. .................. 280/728.3; 280/732; 280/728.2

(58) Field of Classification Search .............. 280/728.3, 280/732, 728.2, 731
See application file for complete search history.

(56) References Cited

U.S. PATENT DOCUMENTS

| 5,433,473 | A | * | 7/1995 | Hiramitsu et al. | ........ | 280/728.3 |
| 6,113,131 | A | * | 9/2000 | Uehara et al. | ............ | 280/728.3 |
| 2003/0197353 | A1 | | 10/2003 | Suzuki et al. | | |
| 2005/0167953 | A1 | | 8/2005 | Weissert | | |

FOREIGN PATENT DOCUMENTS

| EP | 1 403 148 A2 | 3/2004 |
| EP | 1 700 755 A2 | 9/2006 |
| JP | 2002 220019 | 8/2002 |
| JP | 2003 137054 | 5/2003 |

\* cited by examiner

*Primary Examiner*—Paul N. Dickson
*Assistant Examiner*—Keith Frisby
(74) *Attorney, Agent, or Firm*—Fitch, Even, Tabin & Flannery (57) ABSTRACT

An interior panel assembly and an airbag device are provided that are equipped with structure for preventing an interior panel and a backing plate from becoming detached from each other. In one form, when an inflator discharges gas, movable door-frame members are moved (lifted) upward by being pushed upward by an inflating airbag. An instrument panel ruptures along a peripheral tear line, causing a door portion to be cut and separated from the surrounding instrument panel. Grooves serving as rupturable sections extend along joint sections between backing plates and leg plates of the movable door-frame members. When the backing plates of the movable door-frame members open outward together with the door portion, the grooves rupture to cause the backing plates to become partially separated from the leg plates. At the sections of the backing plates partially separated from the leg plates, the backing plates become substantially flat as a result of the partial separation from the leg plates.

4 Claims, 13 Drawing Sheets

INTERIOR PANEL ASSEMBLY AND AIRBAG DEVICE

FIELD OF THE INVENTION

The present invention relates to airbag devices set in, for example, front of passenger's seats of vehicles, and particularly, to an airbag device whose door portion is lifted towards the vehicle interior during inflation of an airbag. The present invention also relates to an interior panel assembly used for such an airbag device.

BACKGROUND OF THE INVENTION

A typical passenger-seat airbag device set in a vehicle includes, for example, a folded airbag, a retainer to which the airbag is attached, an inflator (gas generator) for inflating the airbag, and an interior panel (such as an instrument panel or a lid) disposed in front of the retainer.

When the inflator generates gas, the airbag starts to inflate and pushes open the interior panel. The interior panel ruptures along a tear line to allow the airbag to deploy to the vehicle interior, whereby the airbag restrains the occupant.

Japanese Unexamined Patent Application Publication No. 2003-137054 discloses a door-portion-lift-type airbag device that is configured to lift an airbag-passing door portion of an instrument panel towards the vehicle interior at the time of inflation of an airbag so as to allow the door portion to be opened smoothly.

Figure 9:
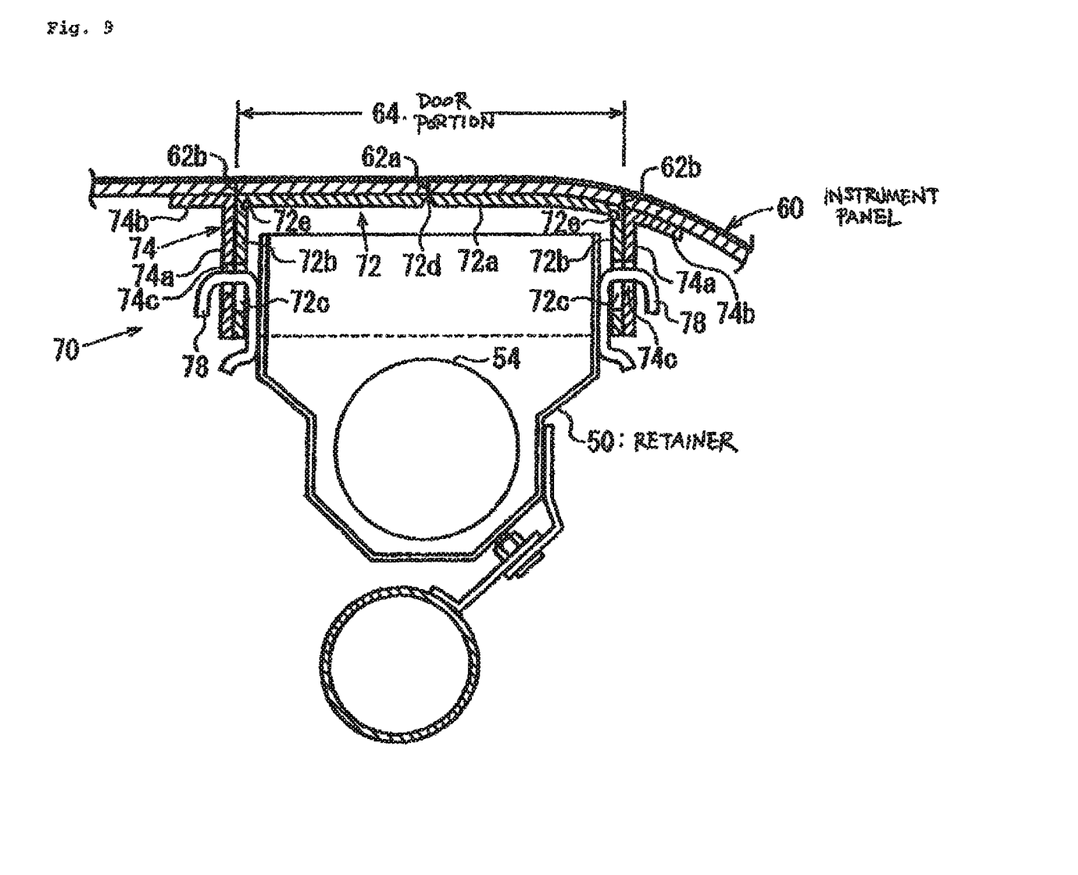
FIG. 9 is a cross-sectional view of an airbag device of related art.
Figure 10:
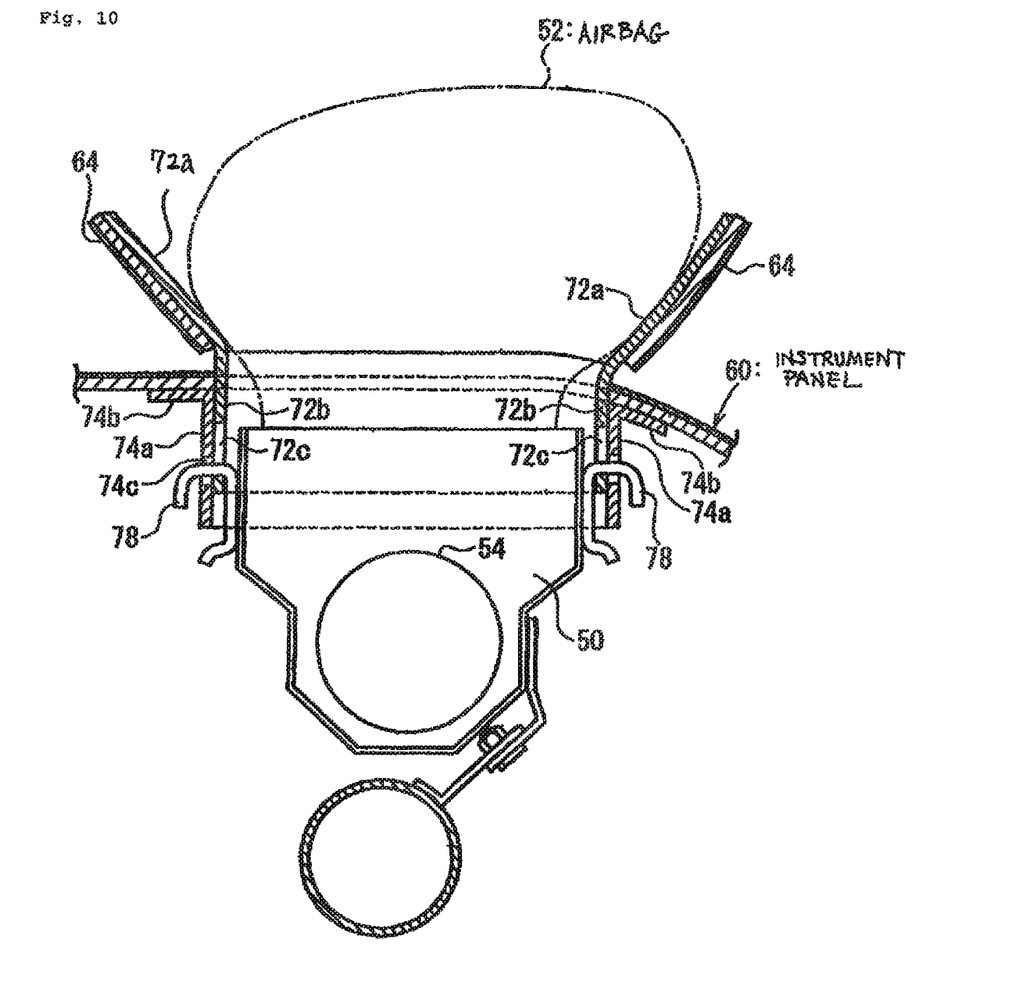
FIG. 10 is a cross-sectional view of the airbag device shown in FIG. 9 in operation.
Figure 11:
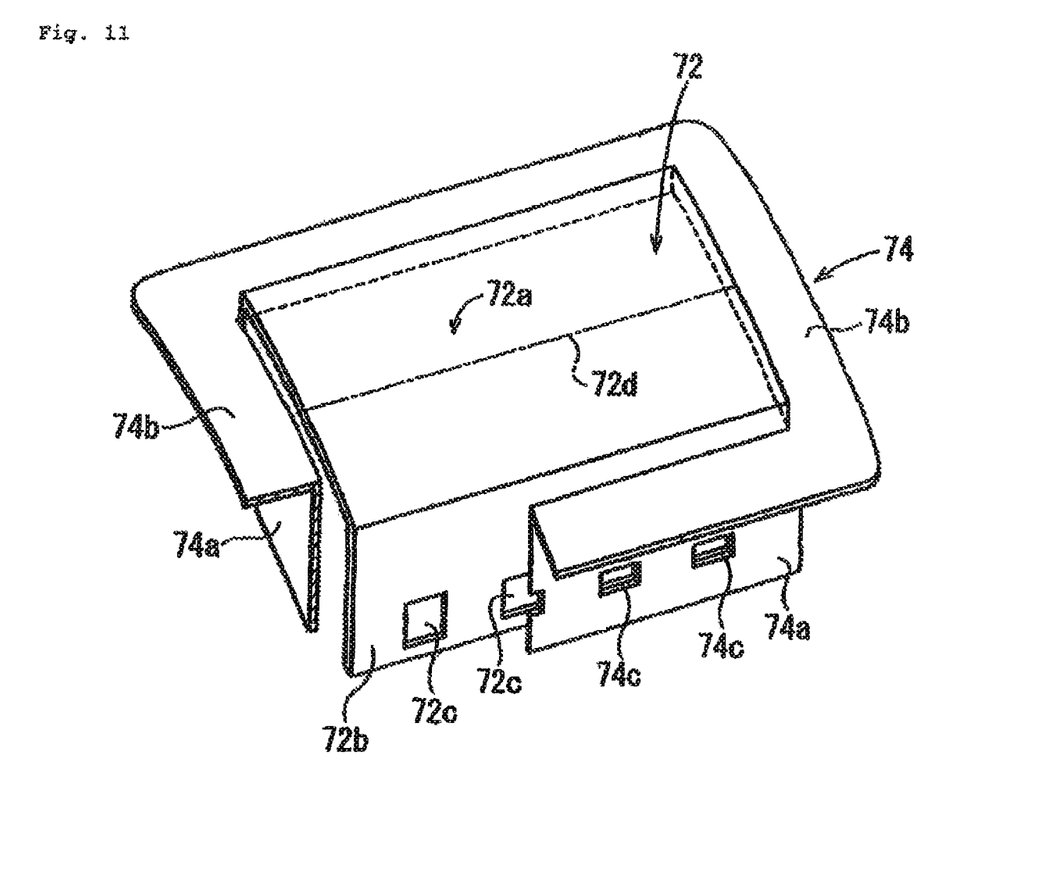
FIG. 11 is a perspective view of a door frame of the airbag device shown in FIG. 9.

FIG. 9 is a cross-sectional view of the airbag device disclosed in Japanese Unexamined Patent Application Publication No. 2003-137054. FIG. 10 is a cross-sectional view of the airbag device in operation. FIG. 11 is a perspective view of a door frame of the airbag device.

Referring to FIG. 9, an airbag 52 (FIG. 10) in a folded state is housed in a retainer 50 of an upper-opening container type and is inflatable by means of an inflator 54.

The upper side of the retainer 50 is covered with an instrument panel 60. The instrument panel 60 is provided with recessed tear lines 62a and 62b. The tear line 62b extends along the upper rim of the retainer 50, and the inner region surrounded by this peripheral tear line 62b defines a door portion 64. On the other hand, the tear line 62a extends so as to traverse the middle of the door portion 64.

Under the instrument panel 60 is provided a door frame 70 constituted by a movable door-frame member 72 and a stationary door-frame member 74. The stationary door-frame member 74 is rectangular and has the movable door-frame member 72 fitted therein in a slidable fashion.

The movable door-frame member 72 has a backing plate 72a that underlies the door portion 64 of the instrument panel 60, and leg plates 72b extending downward in FIG. 9 from opposite edges of the backing plate 72a. The leg plates 72b are provided with hook holes 72c. The backing plate 72a has a tear line 72d in alignment with the tear line 62a. Along the edges where the backing plate 72a and the leg plates 72b meet are provided recessed hinge grooves 72e.

The backing plate 72a is fixed to the undersurface of the door portion 64 of the instrument panel 60 by vibration welding.

The stationary door-frame member 74 includes a rectangular leg frame 74a serving as a leg portion that surrounds the outer periphery of the retainer 50, and a flange portion 74b that extends outward from the upper end of the leg frame 74a. The flange portion 74b is fixed to an area of the instrument panel 60 surrounding the door portion 64 by vibration welding. The leg frame 74a is provided with hook holes 74c.

The retainer 50 has uncinated hooks 78 fixed thereto, which are inserted through the hook holes 72c and 74c.

Referring to FIG. 10, when the inflator 54 discharges gas, the movable door-frame member 72 is moved (lifted) upward by being pushed upward by the inflating airbag 52. The instrument panel 60 ruptures along the tear line 62b, causing the door portion 64 to be cut and separated from the surrounding instrument panel 60. As the door portion 64 is moved further upward together with the movable door-frame member 72 and is pushed upward by the airbag 52, the tear line 72d of the backing plate 72a and the tear line 62a of the door portion 64 become ruptured, thus causing the door portion 64 to open in the form of a door by being separated into two segments in the left and right directions in FIG. 10. As a result, the airbag 52 deploys toward the vehicle interior.

Because the door portion 64 lifted in this manner becomes separated from the surrounding instrument panel 60, the door portion 64 can be opened smoothly without receiving a deformation reaction force from the surrounding instrument panel 60.

In the airbag device shown in FIGS. 9 to 11, when the airbag 52 inflates and lifts the movable door-frame member 72 upward, a large force that tries to detach the door portion 64 of the instrument panel 60 from the backing plate 72a acts on the joint sections between the backing plate 72a and the leg plates 72b.

Figure 12:
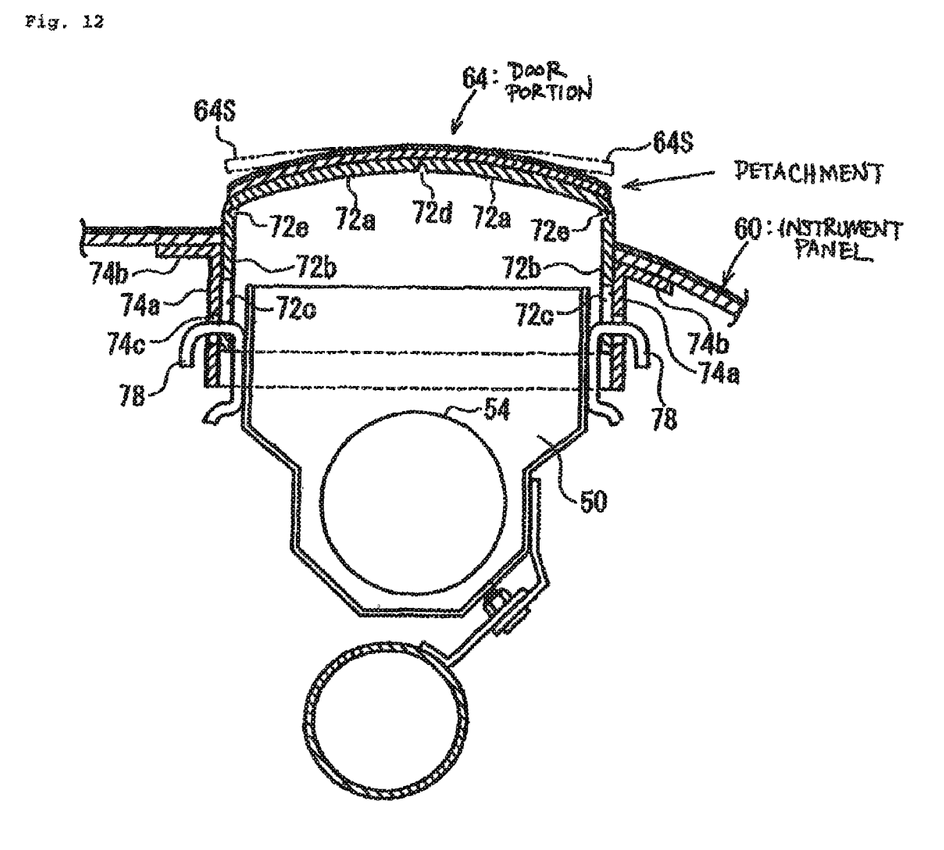
FIG. 12 is a cross-sectional view of the airbag device shown in FIG. 9 in operation.

This phenomenon will be described with reference to FIG. 12. FIG. 12 is a schematic cross-sectional view showing a state immediately after the start of the lifting operation.

Referring to FIG. 12, when the movable door-frame member 72 and the door portion 64 are being lifted, the airbag 52 pushes the door portion 64 so that an area near the central tear line 72d forms an upward projecting bulge. In this state, the door portion 64 of the instrument panel 60 is cut and separated from its surroundings and has a rectangular shape with a size substantially the same as that of the backing plate 72a. Since this rectangular door portion 64 tries to maintain its flatness with its own rigidity as shown with a dot-chain line, opposite edges 64S of the door portion 64 try to detach themselves from the backing plate 72a. This detachment tends to occur at corner sections of the backing plate 72a proximate to the leg plates 72b.

In order to prevent such detachment of the opposite edges 64S of the door portion 64, it is necessary to carefully attach the instrument panel 60 and the backing plate 72a to each other by vibration welding. For this reason, the vibration welding process and the management thereof are time consuming.

SUMMARY OF THE INVENTION

The object of the present invention is to solve the aforementioned problems by providing an interior panel assembly and an airbag device that are equipped with means for preventing an interior panel and a backing plate from becoming detached from each other.

An interior panel assembly according to a first form of the invention includes an interior panel having a door portion through which an airbag passes and also includes a door frame for an airbag device, the door frame being fixed to an undersurface of the interior panel. The door frame includes a backing plate fixed to an undersurface of the door portion, and a leg portion connected to the backing plate and projecting from the undersurface of the interior panel. The door portion is openable toward a front side of the interior panel when the airbag inflates. A joint section between the backing plate and the leg portion or a vicinity of the joint section is provided with a rupturable section that allows the backing plate and the leg portion to become partially separated from each other when the door portion opens.

The interior panel assembly according to a second form is characterized in that, in the first form, the backing plate and the interior panel are fixed to each other by vibration welding.

The interior panel assembly according to a third form is characterized in that, in one of the first and second forms, the door frame includes a stationary door-frame member and a movable door-frame member. In this case, the stationary door-frame member includes a rectangular tubular leg frame and a flange portion extending outward from the leg frame along the undersurface of the interior panel. The movable door-frame member includes a leg plate serving as the leg portion and movable along an inner surface of the leg frame, and the backing plate connected to the leg plate.

The interior panel assembly according to a fourth form is characterized in that, in the third form, the rupturable section is defined by a groove that extends along the joint section between the backing plate and the leg plate.

The interior panel assembly according to a fifth form is characterized in that, in the fourth form, an end of the groove in an extending direction thereof is provided with a stopper that stops a rupture from spreading outward from the groove.

The interior panel assembly according to a sixth form is characterized in that, in the fifth form, the stopper is defined by a recessed hole connected to the end of the groove and having a substantially circular shape with a diameter larger than a width of the groove.

The interior panel assembly according to a seventh form is characterized in that, in one of the fourth to the sixth forms, one end of the groove is aligned with a rim of the movable door-frame member.

An airbag device according to an eighth form includes the interior panel assembly according to any one of the first to the seventh forms, an airbag disposed at an underside of the interior panel assembly, and an inflator for inflating the airbag.

In the airbag device and the interior panel assembly according to the present invention, the joint section between the backing plate and the leg portion or the vicinity of the joint section is provided with a rupturable section. When the door portion opens, the rupturable section ruptures so that the backing plate and the leg portion become partially separated from each other. At the section of the backing plate partially separated from the leg portion, the backing plate becomes substantially flat as a result of the partial separation from the leg portion. In other words, the radius of curvature of the door portion at this separated section becomes smaller. As a result, this prevents the backing plate and the door portion from becoming detached from each other at the separated section.

As in the second form, the backing plate and the interior panel are joined to each other by vibration welding so that the backing plate and the interior panel can be securely fixed to each other.

In the third form, when the airbag inflates, the movable door-frame member is lifted by being pushed by the inflating airbag, whereby the door portion becomes cut and separated from the surrounding interior panel. Accordingly, the door portion can be opened smoothly without receiving a deformation reaction force from the surrounding interior panel.

In this case, the rupturable section is provided along the joint section between the backing plate and the leg plate serving as the leg portion of the movable door-frame member. When the backing plate is opened together with the door portion, the rupturable section ruptures and causes the backing plate to become partially separated from the leg plate. At the section of the backing plate partially separated from the leg plate, the backing plate becomes substantially flat as a result of the partial separation from the leg plate, thereby preventing the backing plate and the door portion from becoming detached from each other at the separated section.

By providing a groove along the joint section between the backing plate and the leg plate as in the fourth form, the rupturable section can be formed readily.

By providing a stopper at the end of the groove as in the fifth form to prevent the rupture from spreading outward from the groove, the backing plate does not become entirely separated from the leg plate when the backing plate opens, thereby preventing the door portion from flying off.

As in the sixth form, the stopper may be defined by a recessed hole connected to the end of the groove and having a substantially circular shape with a diameter larger than the width of the groove. In this way, the stopper can be formed readily.

By aligning one end of the groove with a rim of the movable door-frame member as in the seventh form, the groove can start to rupture smoothly.

DETAILED DESCRIPTION OF THE PREFERRED EMBODIMENTS

Figure 1:
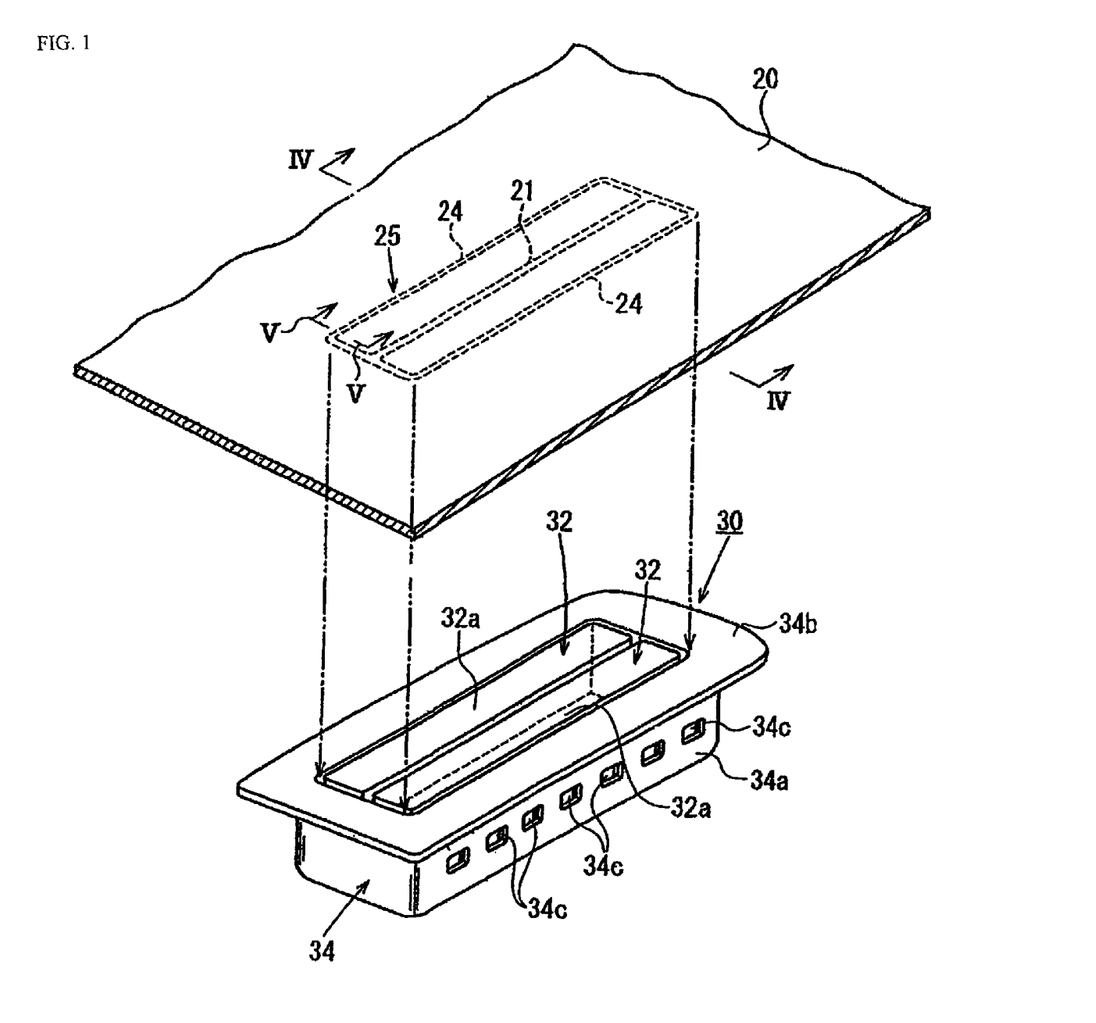
FIG. 1 is an exploded perspective view of an interior panel assembly according to an embodiment.
Figure 2:
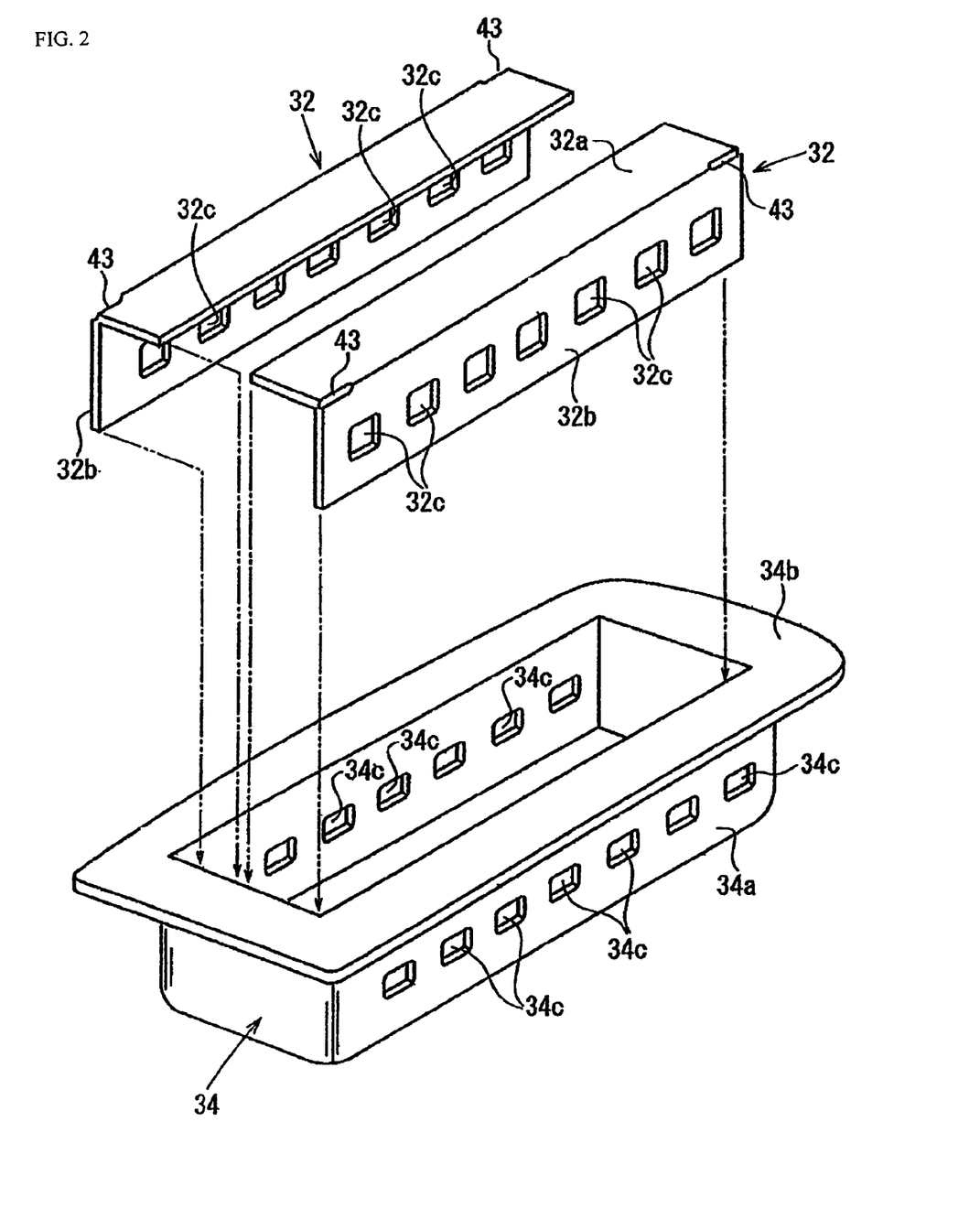
FIG. 2 is an exploded perspective view of a door frame.
Figure 3:
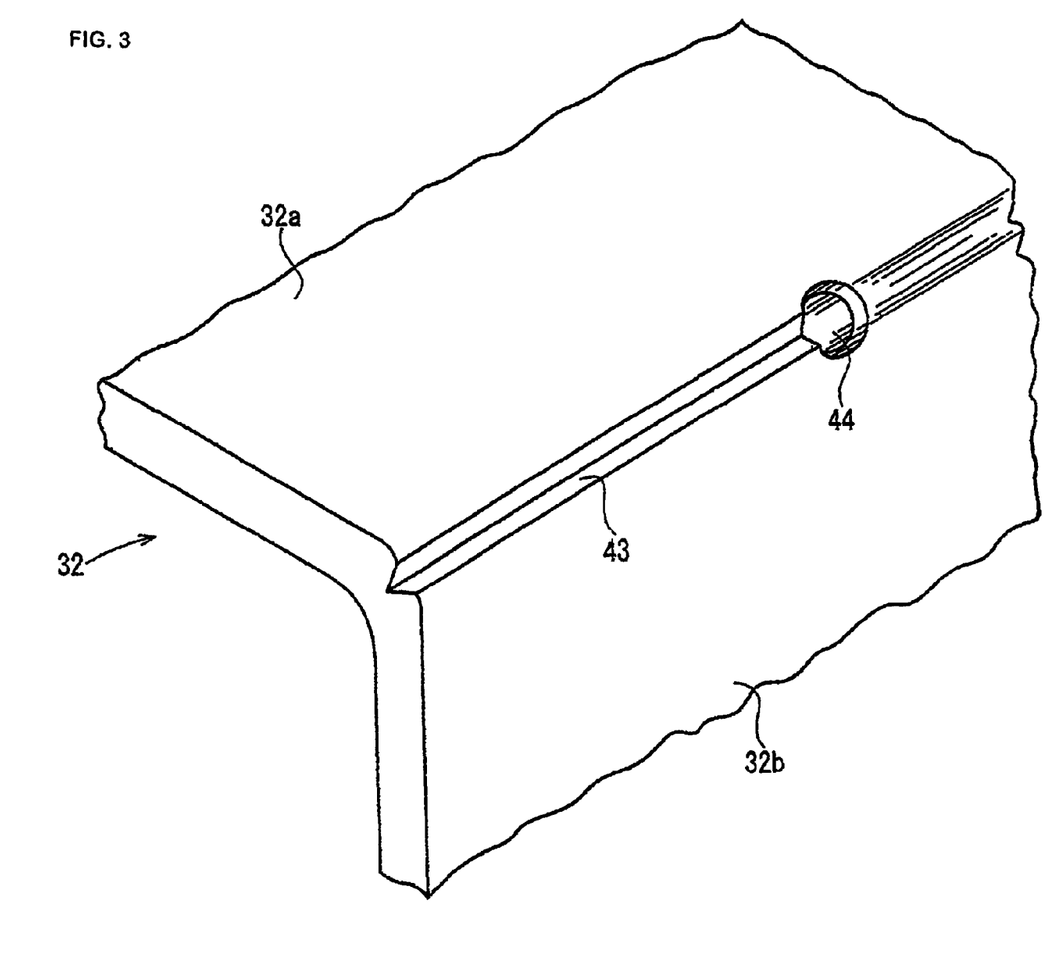
FIG. 3 is a perspective view of a rupturable section of one of movable door-frame members and the vicinity thereof.
Figure 4:
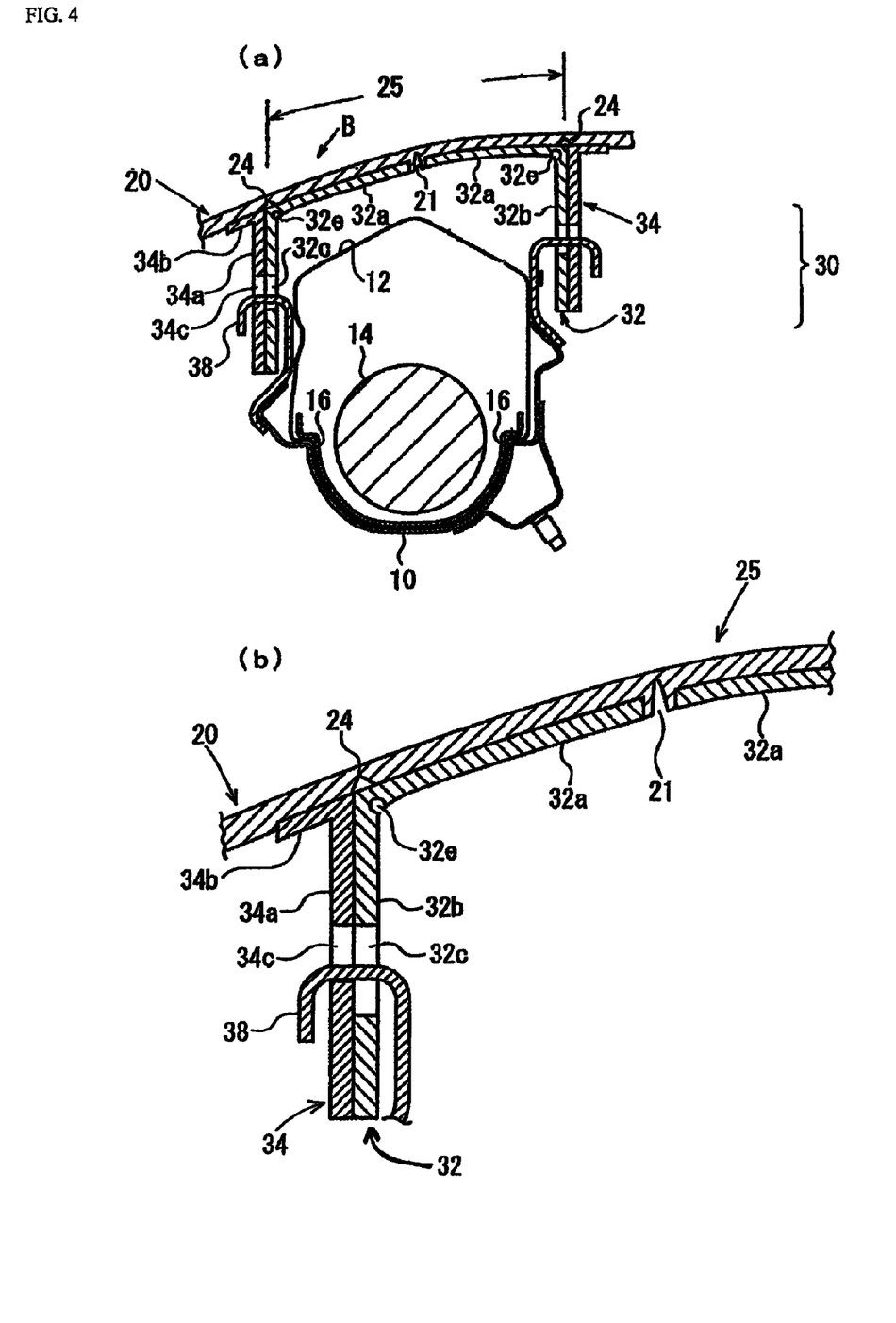
FIGS. 4(a) and 4(b), respectively, include an overall cross-sectional view and an enlarged view of an airbag device equipped with the interior panel assembly shown in FIG. 1.
Figure 5:
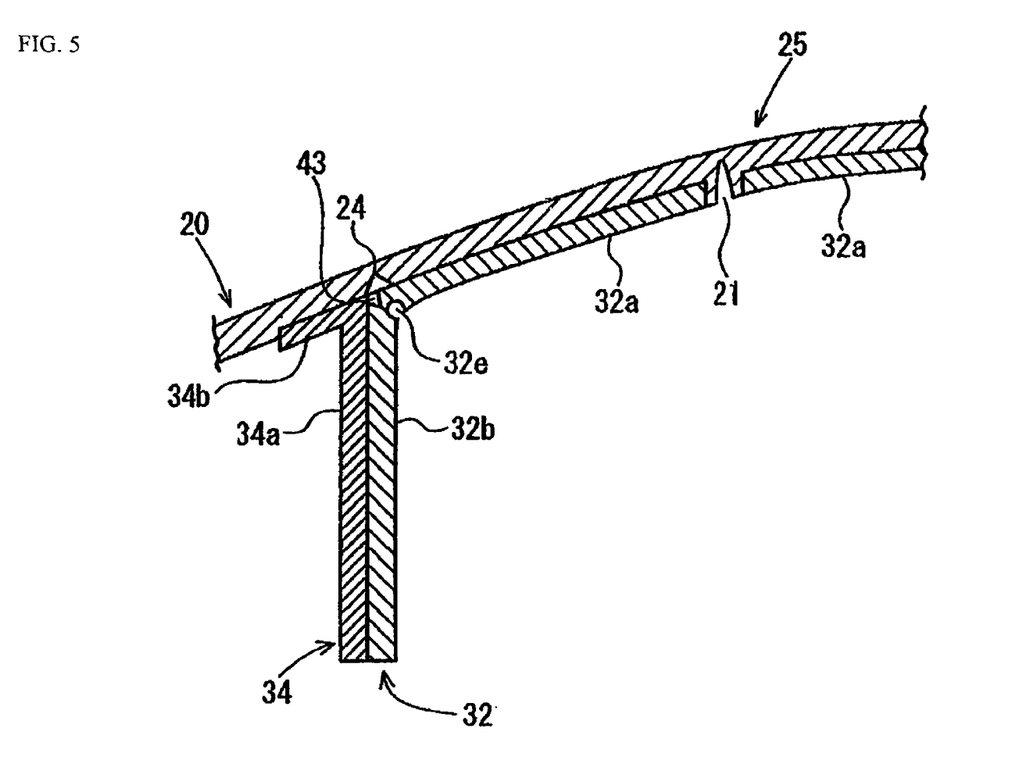
FIG. 5 is a cross-sectional view taken along line V-V in FIG. 1.
Figure 6:
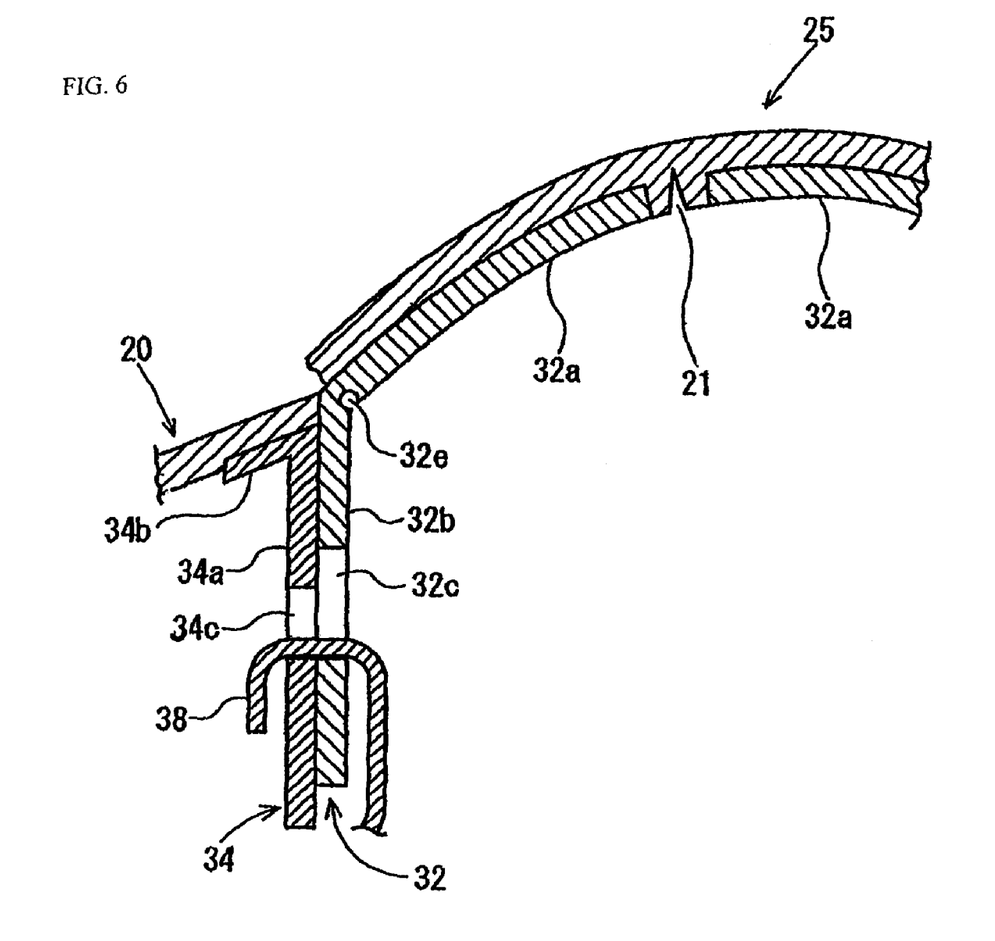
FIG. 6 is a cross-sectional view showing the same area as FIG. 4(b), and illustrates a state after the movable door-frame members are lifted and a pre-opened state of a door portion.
Figure 7:
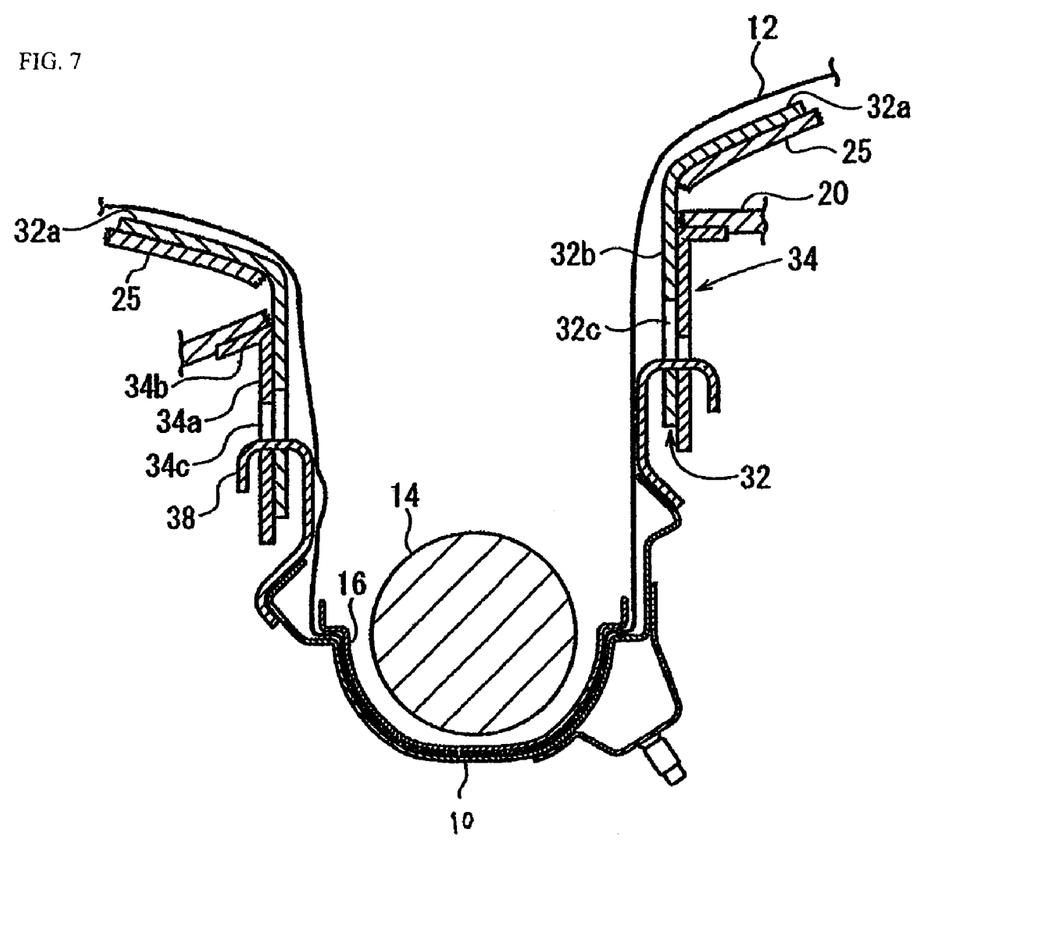
FIG. 7 is a cross-sectional view showing the same area as FIG. 4(a) and illustrates a state where the door portion has been opened.
Figure 8:
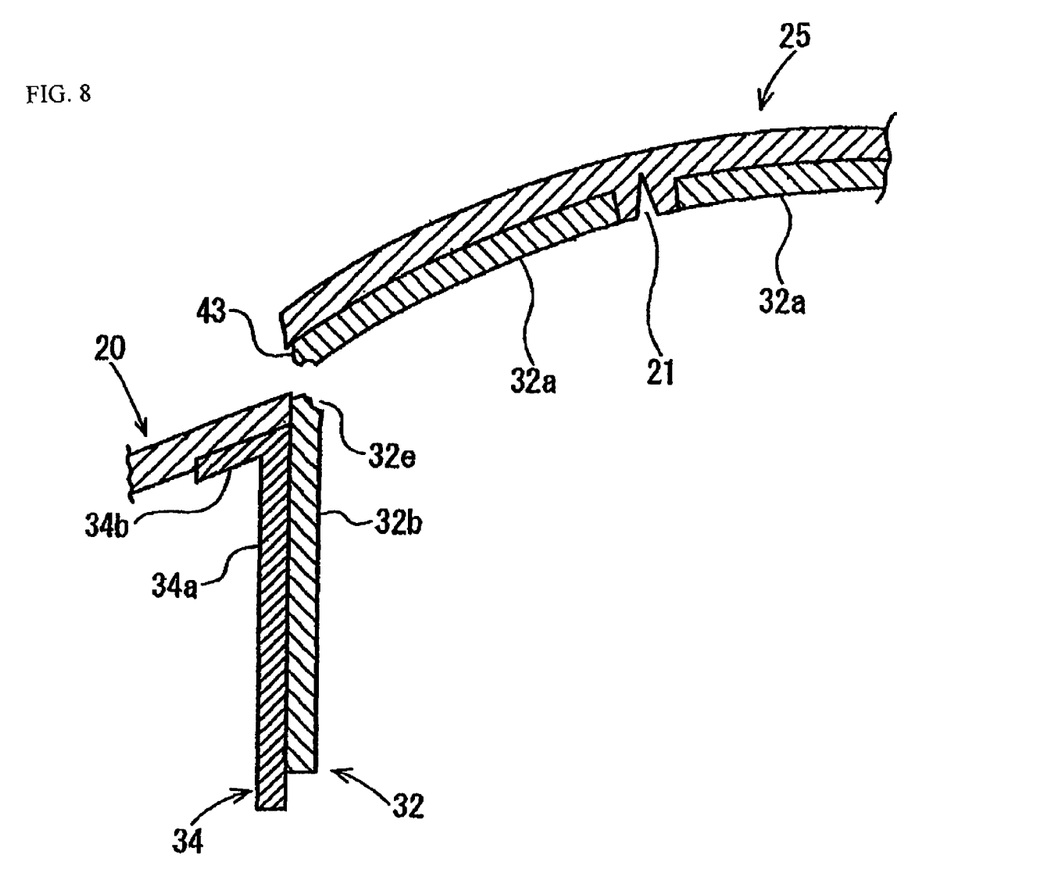
FIG. 8 is a cross-sectional view showing the same area as FIG. 5, and illustrates a state after the movable door-frame members are lifted and a pre-opened state of the door portion.

Embodiments will now be described with reference to the drawings. FIG. 1 is an exploded perspective view of an interior panel assembly according to an embodiment. FIG. 2 is an exploded perspective view of a door frame used in this assembly. FIG. 3 is a perspective view of a rupturable section of one of movable door-frame members and the vicinity thereof. FIG. 4(a) is an overall cross-sectional view of an airbag device equipped with the interior panel assembly. FIG. 4(b) is an enlarged view of an area B in FIG. 4(a). FIG. 5 is a cross-sectional view taken along line V-V in FIG. 1. FIG. 6 is a cross-sectional view showing the same area as FIG. 4(b), and illustrates a state after the movable door-frame members are lifted and a pre-opened state of a door portion. FIG. 7 is a cross-sectional view showing the same area as FIG. 4(a) and illustrates a state where the door portion has been opened. FIG. 8 is a cross-sectional view showing the same area as FIG. 5, and illustrates a state after the movable door-frame members are lifted and a pre-opened state of the door portion. Specifically, FIGS. 4(a) and 4(b) are cross-sectional views taken along line IV-IV in FIG. 1.

Referring to FIG. 1, an instrument panel 20 has a central tear line 21 and a peripheral tear line 24 that are respectively similar to the tear lines 62a and 62b of the instrument panel 60 shown in FIGS. 9 to 11. The inner region of the peripheral tear line 24 defines a door portion 25. The peripheral tear line 24 extends to form a substantially rectangular shape. The central tear line 21 extends so as to connect intermediate points of the lateral sides of this rectangle to each other.

Under the door portion 25 is provided a door frame 30. In this embodiment, the door frame 30 is constituted by movable door-frame members 32 and a stationary door-frame member 34.

The stationary door-frame member 34 has a leg frame 34a of a substantially rectangular tubular shape having a pair of longitudinal walls and a pair of lateral walls, and a flange portion 34b extending outward from the leg frame 34a along the undersurface of the instrument panel 20. The movable door-frame members 32 have leg plates 32b that are movable along the inner surfaces of the longitudinal walls of the leg frame 34a, and backing plates 32a connected to the leg plates 32b and fixed to the undersurface of the instrument panel 20. Along the edges where the backing plates 32a and the leg plates 32b meet are provided recessed hinge grooves 32e.

In this embodiment, there are two movable door-frame members 32 provided. Specifically, one of the movable door-frame members 32 is disposed along one of the longitudinal walls of the leg frame 34a, and the other movable door-frame member 32 is disposed along the other longitudinal wall of the leg frame 34a. The backing plates 32a of the two movable door-frame members 32 respectively underlie one half and the other half of the door portion 25 with respect to the central tear line 21 therebetween.

Each movable door-frame member 32 has grooves 43 provided along the joint section between the backing plate 32a and the leg plate 32b. Specifically, the grooves 43 serve as rupturable sections that partially separate the backing plate 32a and the leg plate 32b from each other when the backing plate 32a starts to open. As shown in FIG. 2, in this embodiment, the grooves 43 in each movable door-frame member 32 extend over a predetermined length at one end and the other end of the joint section between the backing plate 32a and the leg plate 32b in the extending direction thereof.

Referring to FIG. 3, one end of each groove 43 is aligned with a rim of the corresponding movable door-frame member 32. Furthermore, in this embodiment, the other end of each groove 43 is provided with a substantially circular recessed hole 44 that serves as a stopper. Specifically, when the groove 43 ruptures, this recessed hole 44 serving as a stopper stops this rupture from spreading outward from the groove 43. The recessed hole 44 has a diameter that is larger than the width of the groove 43. This other end of the groove 43 is in communication with the recessed hole 44.

In this invention, each groove 43 has a length that is 5% to 30%, more preferably, 10% to 50% of the overall width of the joint section between the corresponding backing plate 32a and the corresponding leg plate 32b from one end to the other end of the joint section in the extending direction thereof.

Referring to FIG. 3, in this embodiment, each groove 43 is formed along a salient edge where a surface of the corresponding backing plate 32a that faces the instrument panel 20 and a surface of the corresponding leg plate 32b that faces the leg frame 34a meet.

The locations of the grooves 43 serving as rupturable sections are not limited to those described above. Instead of the salient edges, the grooves 43 may be located on the surfaces of the backing plates 32a that face the instrument panel 20 or on the surfaces of the leg plates 32b that face the leg frame 34a. In that case, each groove 43 is preferably disposed on the corresponding backing plate 32a or leg plate 32b within a range of 0 to 20 mm, more preferably, within a range of 0 to 10 mm from the corresponding salient edge. In the present invention, the grooves 43 may alternatively be disposed on the surfaces of the backing plates 32a that face away from the instrument panel 20, the surfaces of the leg plates 32b that face away from the leg frame 34a, or the edges where these surfaces meet.

The pair of movable door-frame members 32 and 32 is fitted in the leg frame 34a in a manner such that the backing plates 32a and 32a are disposed with a gap therebetween. The backing plates 32a and 32a and the flange portion 34b of the stationary door-frame member 34 are pressed against the undersurface of the instrument panel 20 and are fixed thereto by vibration welding. The central tear line 21 of the instrument panel 20 is set between the backing plates 32a and 32a. On the other hand, the peripheral tear line 24 extends along the sides of the backing plates 32a and 32a.

The leg plates 32b of the movable door-frame members 32 are provided with hook holes 32c. The hook holes 32c are long in the moving direction of the movable door-frame members 32 (i.e. a direction substantially orthogonal to the undersurface of the instrument panel 20). The leg frame 34a of the stationary door-frame member 34 is provided with hook holes 34c at positions where they coincide with the hook holes 32c.

A retainer 10 has uncinated hooks 38 fixed thereto, which are inserted through the hook holes 32c and 34c. The leg frame 34a is disposed so as to surround the outer periphery of the retainer 10.

The retainer 10 houses an airbag 12 in a folded state, which is inflatable by means of an inflator 14. The airbag 12 is attached to the retainer 10 by means of a mounting fitting 16.

The airbag device operates in the following manner.

Referring to FIGS. 6 and 8, when the inflator 14 discharges gas, the movable door-frame members 32 are moved (lifted) upward by being pushed upward by the inflating airbag 12. During the lifting of the movable door-frame members 32, the hooks 38 move downward relatively within the hook holes 32c. In addition, the instrument panel 20 ruptures along the peripheral tear line 24, causing the door portion 25 to become cut and separated from the surrounding instrument panel 20.

As shown in FIGS. 6 and 8, the airbag 12 pushes this separated door portion 25 so that an area near the central tear line 21 forms an upward projecting bulge. However, since the door portion 25 tries to maintain its flatness with its own rigidity, the opposite edges of the door portion 25 (opposite edges as viewed in the horizontal direction in FIGS. 6 and 8) try to detach themselves from the backing plates 32a.

In this case, a stress that tries to deform the backing plates 32a into a flat shape is applied from the door portion 25 to the backing plates 32a. This stress causes the grooves 43 located at the opposite ends of the joint sections between the backing plates 32a and the leg plates 32b to rupture, whereby the opposite edges of the backing plates 32a (i.e. opposite edges as viewed in the extending direction of the joint sections between the backing plates 32a and the leg plates 32b; the same applies hereinafter) become partially separated from the leg plates 32b. Consequently, at the corner sections of the opposite edges of the backing plates 32a partially separated from the leg plates 32b, the backing plates 32a become substantially flat as a result of the partial separation from the leg plates 32b. In other words, the radius of curvature of the door portion 25 at the corner sections of the opposite edges of the backing plates 32a becomes smaller. As a result, this prevents the backing plates 32a and the door portion 25 from becoming detached from each other at the corner sections of the opposite edges of the backing plates 32a.

Subsequently, the door portion 25 ruptures along the central tear line 21 in response to a pressing force from the airbag 12, whereby the door portion 25 opens in the form of a door by being separated into two segments together with the backing plates 32a and 32a in the left and right directions in FIG. 7. As a result, the airbag 12 passes through between the separated segments of the opened door portion 25 so as to deploy toward the vehicle interior.

In this embodiment, since one end of each groove 43 is aligned with a rim of the corresponding movable door-frame member 32, the groove 43 ruptures immediately as the door portion 25 tries to recover its flatness from the curved state. In addition, the other end of each groove 43 is provided with a recessed hole 44 that serves as a stopper. Therefore, when the rupture of the groove 43 reaches the recessed hole 44, the recessed hole 44 spreads the shearing stress in order to stop the rupture. The rupture is thus prevented from spreading outward from the groove 43. Accordingly, when the backing plates 32a open, the backing plates 32a do not become entirely separated from the leg plates 32b, thereby preventing the door portion 25 from flying off.

Figure 13:
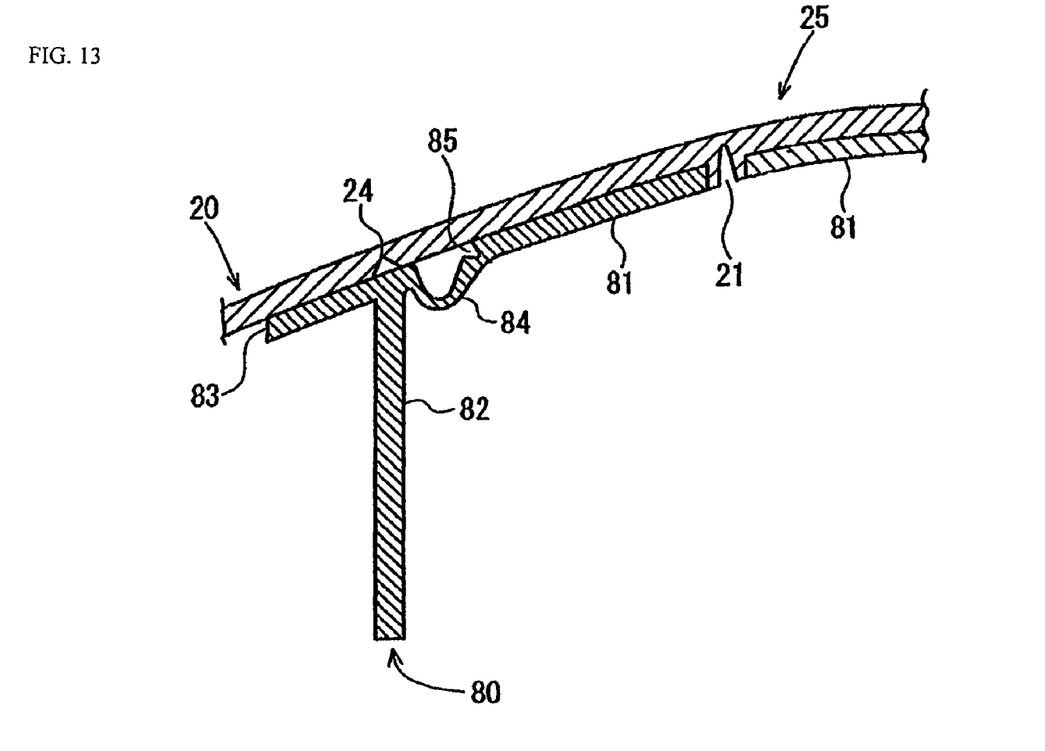
FIG. 13 is a cross-sectional view of an interior panel assembly according to another embodiment.

FIG. 13 is a perspective view of one of joint sections between backing plates and leg plates of door frames of an interior panel assembly according to another embodiment.

Door frames 80 included in the interior panel assembly according to this embodiment each include a backing plate 81 fixed to the undersurface of the door portion 25 of the instrument panel 20, a leg portion 82 connected to one edge of the backing plate 81 via an allowance portion 84 to be described hereinafter and extending downward from the underside of the instrument panel 20, and a flange portion 83 extending along the undersurface of the instrument panel 20 from the upper edge of the leg portion 82 (upper edge in FIG. 13; the same applies hereinafter) in a direction away from the backing plate 81.

The backing plate 81 and the leg portion 82 have a substantially U-shaped allowance portion 84 therebetween, which hangs downward from the undersurface of the instrument panel 20 so as to be separated therefrom. In this embodiment, the one edge of the backing plate 81 and the upper edge of the leg portion 82 are connected to each other with the allowance portion 84. Specifically, in this embodiment, the allowance portion 84 functions as a connector between the backing plate 81 and the leg portion 82. When the airbag (not shown) inflates, each door frame 80 receives a pressing force from the airbag and lifts the door portion 25 by stretching the allowance portion 84 toward the vehicle interior.

In this embodiment, grooves 85 that serve as rupturable sections extend along a salient edge where a surface of each backing plate 81 that faces the instrument panel 20 and a surface of each allowance portion 84 that faces the instrument panel 20 meet. In this embodiment, although not shown in detail, the grooves 85 extend over a predetermined length at one end and the other end of the corresponding allowance portion 84 in the extending direction thereof.

The locations of the grooves 85 serving as rupturable sections are not limited to those described above. Instead of the salient edges, the grooves 85 may be located on the surfaces of the backing plates 81 that face the instrument panel 20 or on the surfaces of the allowance portions 84 that face the instrument panel 20. Alternatively, the grooves 85 may be disposed on the surfaces of the backing plates 81 that face away from the instrument panel 20, the surfaces of the allowance portions 84 that face away from the instrument panel 20, or the edges where these surfaces meet. As a further alternative, the grooves 85 may be disposed on or near the edges of the allowance portions 84 proximate to the leg portions 82, or on or near the upper edges of the leg portions 82 connected to the allowance portions 84.

In this embodiment, the backing plates 81 of the two door frames 80 and 80 respectively underlie one half and the other half of the door portion 25 with respect to the central tear line 21 therebetween. The backing plates 81 and the flange portions 83 are fixed to the door portion 25 by vibration welding. The central tear line 21 is set between the backing plates 81 and 81 of the respective door frames 80 and 80. On the other hand, the peripheral tear line 24 is set so as to extend along joint sections between the backing plates 81 and the leg portions 82 of the door frames 80.

In this embodiment, when the airbag inflates, the inflating airbag pushes the backing plates 81 upward and causes the allowance portions 84 to become stretched, thereby lifting the backing plates 81. Then, the instrument panel 20 ruptures along the peripheral tear line 24, causing the door portion 25 to become cut and separated from the surrounding instrument panel 20.

The airbag pushes the separated door portion 25 so that an area near the central tear line 21 forms an upward projecting bulge. However, since the door portion 25 tries to maintain its flatness with its own rigidity, the opposite edges of the door portion 25 (opposite edges as viewed in the horizontal direction in FIG. 13) try to detach themselves from the backing plates 81.

In this case, a stress that tries to deform the backing plates 81 into a flat shape is applied from the door portion 25 to the backing plates 81. This stress causes the grooves 85 located at the opposite ends of the joint sections between the backing plates 81 and the allowance portions 84 to rupture, whereby the opposite edges of the backing plates 81 (i.e. opposite edges as viewed in the extending direction of the allowance portions 84; the same applies hereinafter) become partially separated from the allowance portions 84. Consequently, at the corner sections of the opposite edges of the backing plates 81 partially separated from the allowance portions 84, the backing plates 81 become substantially flat as a result of the partial separation from the allowance portions 84. In other words, the radius of curvature of the door portion 25 at the corner sections of the opposite edges of the backing plates 81 becomes smaller. As a result, this prevents the backing plates 81 and the door portion 25 from becoming detached from each other at the corner sections of the opposite edges of the backing plates 81.

Subsequently, the door portion 25 ruptures along the central tear line 21 in response to a pressing force from the airbag, whereby the door portion 25 opens in the form of a door by being separated into two segments together with the backing plates 81 and 81 in the left and right directions in FIG. 13. As a result, the airbag passes through between the separated segments of the opened door portion 25 so as to deploy toward the vehicle interior.

The above-described embodiments are only examples of the present invention, and the present invention is not limited to these embodiments.

Although the interior panel is defined by the instrument panel 20 in each of the above-described embodiments, the interior panel may alternatively be defined by, for example, a lid.

In each of the above-described embodiments, a door frame is configured to allow a door portion of an interior panel to be lifted in response to a pressing force of an airbag generated at the time of inflation of an airbag. However, a door frame is not limited to this configuration. The present invention is applicable to an interior panel assembly equipped with a door frame of a type in which a door portion can be opened without being lifted.

What is claimed is:

1. An instrument panel assembly comprising:
    an airbag;
    an instrument panel including a door portion having an undersurface facing the airbag;
    an outer frangible portion of the instrument panel extending about the door portion and configured to rupture and cause the door portion to separate from the instrument panel, upon deployment of the airbag;
    a central frangible portion extending generally centrally along the instrument panel door portion and configured to cause the door portion to rupture at the central frangible portion after separating from the instrument panel so that the door portion bulges outwardly to protrude further outwardly at the central frangible portion than at the earlier ruptured outer frangible portion before rupture of the central frangible portion during airbag deployment;
    a door frame under the instrument panel;
    a stationary door frame member of the door frame connected to the instrument panel adjacent the door portion thereof;
    a moveable door frame member connected to the stationary door frame member for being shifted relative thereto upon airbag deployment;
    adjacent depending leg portions of the stationary and movable door frame members with the leg portions of the moveable door frame member shifting relative to the adjacent leg portions of the stationary door frame member upon airbag deployment;
    a pair of backing plate portions of the moveable door frame member extending transverse to the moveable door frame member leg portions, and being attached to the undersurface of the door portion to extend therealong with the central frangible portion extending between the backing plate portions;
    a hinge joint between each backing plate portion and corresponding leg portion of the moveable frame member so that the backing plate portions stay hingedly connected to the leg portions during airbag deployment; and
    rupturable grooves of the movable door frame provided along each hinge joint to partially separate each backing plate portion from the corresponding leg portion when the backing plate portion starts to open, the rupturable grooves each being configured as an elongate channel preformed in the respective hinge joints prior to airbag deployment so that the grooves do not extend completely through the hinge joints and the hinge joints are thinner along the grooves;
    wherein the backing plate portions and the stationary door frame member are fixed to the instrument panel by vibration welding;
    the rupturable grooves extend over a predetermined length between one end and the other end of each hinge joint in the extending direction thereof, and one end of each rupturable groove is aligned with a rim of the movable door frame member;
    the sum of the length of the rupturable grooves in each hinge joint is less than the full length of the backing plate portion in the extending direction of the hinge joint;
    the channel configuration of the rupturable grooves providing the grooves with a strength lower than that of the central frangible portion to cause the grooves to rupture during airbag deployment prior to rupture of the central frangible portion when the backing plate portions and overlying door portions are pushed by the inflating airbag to allow the backing plate portions and overlying door portions to have a flat, attached configuration at the ruptured rupturable grooves; and
    each backing plate portion is connected to the corresponding leg portion of the movable door frame member via each hinge joint over the entire length of the backing plate portion until the rupturable grooves rupture.

2. The instrument panel assembly of claim 1 wherein the rupturable groove has a length that is between approximately 10% to approximately 50% of the length of the backing plate portions.

3. The instrument panel assembly of claim 1 wherein the rupturable groove starts at one of the ends of the backing plate portions, and has an enlarged recess at a terminal end of the groove so that the backing plate portions do not rupture beyond the terminal ends of the grooves.

4. The instrument panel assembly of claim 1 wherein the hinge joints comprise elongate hinge grooves formed in a surface of the moveable frame member generally facing inwardly, away from the instrument panel, and the rupturable grooves are formed in an opposite, outwardly facing surface of the moveable frame member.

* * * * *